UNITED STATES PATENT OFFICE 2,666,056

2-ALKOXYHEXAHYDROPYRIMIDINE - 4,6 - DIONE DERIVATIVES AND PROCESS OF PREPARING SAME

William Robert Boon and Charles Henry Vasey, Manchester, England, assignors to Imperial Chemical Industries Limited, a corporation of Great Britain No Drawing. Application March 31, 1952, Serial No. 279,686

Claims priority, application Great Britain April 6, 1951

2 Claims. (Cl. 260—260)

This invention relates to new pyrimidine derivatives and to processes for the manufacture of the said new pyrimidine derivatives. The new pyrimidine derivatives possess anti-convulsant properties and are also useful as intermediates in the manufacture of other pyrimidine derivatives possessing anti-convulsant properties.

According to the invention we provide new 2-alkoxyhexahydropyrimidine-4:6-dione derivatives of the formula

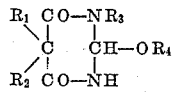

wherein $R_1$ stands for a monocyclic carbocyclic radical or for an alkenyl radical of not more than 3 carbon atoms, $R_2$ stands for an alkyl radical or an alkenyl radical of not more than 3 carbon atoms, $R_3$ stands for hydrogen or for an alkyl radical of not more than 4 carbon atoms and $R_4$ stands for an alkyl radical, an alkenyl radical or an aralkyl radical.

The said new 2-alkoxyhexahydropyrimidine-4:6-dione derivatives may be regarded as alcoholates of the corresponding tetrahydropyrimidine-4:6-diones into which they may readily be converted and from which they may readily be obtained, and which also possess anticonvulsant properties and which possess the same utility as intermediates as do the derived alcoholates.

Thus also according to the invention we provide the new tetrahydropyrimidine-4:6-dione derivatives of the formula:

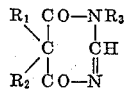

wherein $R_1$, $R_2$ and $R_3$ have the meaning stated above and their hydrates and salts.

All the new pyrimidine derivatives of this invention themselves possess useful anti-convulsant properties. They are also, as said, useful as intermediates, in that they may be used in the manufacture, by the process of co-pending British application No. 8021/51 which corresponds with U. S. application S. N. 279,687, of even date herewith, of pyrimidine derivatives which possess useful anti-convulsant properties and which are themselves the subject of co-pending British application No. 19,761/49 (U. S. Serial No. 666,027).

According to a further feature of the invention we provide a process for the manufacture of the new 2 - alkoxy - hexahydropyrimidine-4:6-dione derivatives which comprises subjecting a 2-thiobarbituric acid of the formula

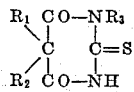

wherein $R_1$, $R_2$ and $R_3$ have the meaning stated above, or an S-alkyl-derivative thereof, to reductive desulphurisation.

Reductive desulphurisation may conveniently be brought about by use of hydrogen-containing finely divided metal catalysts for example Raney metal catalysts especially Raney cobalt and Raney nickel particularly that described as W1 (Adkins and Pavlic, Journal of the American Chemical Society, 1947, 69, 3040) or, if not used in excess, that described as W5 (Journal of the American Chemical Society, 1948, 70, 695). The reaction may conveniently be carried out in alcoholic solution.

According to yet a further feature of the invention we provide a process for the manufacture of those of the new 2-alkoxy-hexahydropyrimidine-4:6-dione derivatives in which $R_3$ stands for hydrogen which comprises reacting a malondiamide derivative of the formula

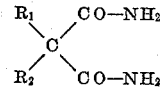

wherein $R_1$ and $R_2$ have the meaning stated above, with a formic acid ester. The reaction is preferably carried out in alcoholic solution.

It may be surmised that this reaction entails the intermediate formation of the N-formyl derivative of the malondiamide, namely, a compound of the formula

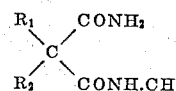

wherein $R_1$ and $R_2$ have the meaning stated above, and it is a further feature of the invention to manufacture those of the new 2-alkoxy-hexahydropyrimidine-4:6-dione derivatives in which $R_3$ stands for hydrogen by interaction of the said N-formyl derivatives with an alcoholic solution of an alkali metal alkoxide.

The said N-formyl derivatives may themselves be obtained by oxidation of a methylol derivative of the diamide by means for example of chromic acid.

According to a still further feature of the invention we provide a process for the manufacture of those of the new 2-alkoxy-hexahydropyrimidine-4:6-dione derivatives in which R₃ stands for hydrogen which comprises reacting an ester of a malonic acid derivative of the formula

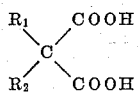

wherein R₁ and R₂ have the meaning stated above with formamidine.

This reaction is preferably carried out in alcoholic solution.

According to another feature of the invention we provide a process for the manufacture of the new tetrahydropyrimidine-4:6-dione derivatives of the invention which comprises subliming in high vacuum the new 2-alkoxy-hexahydropyrimidine-4:6-dione derivatives of the formula

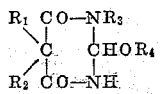

wherein R₁, R₂, R₃ and R₄ have the meaning stated above.

The tetrahydropyrimidine-4:6-dione derivatives are not characterised by sharp melting points but they form monohydrates and salts, for example monohydrochlorides, which are readily so characterised. According to yet another feature of the invention we provide a process for the manufacture of the said tetrahydropyrimidine - 4:6 - dione derivatives which comprises treating the said 2-alkoxy-hexahydropyrimidine-4:6-dione derivatives with mineral acids. When the tetrahydropyrimidine - 4:6-dione derivatives or their monohydrates or their salts are dissolved in an excess of alcohol a 2-alkoxy-hexahydropyrimidine-4:6-dione derivative is formed.

The invention is illustrated but not limited by the following examples in which the parts are by weight.

Example 1

3 parts of 5-phenyl-5-ethyl-2-thiobarbituric acid in 50 parts of ethanol are heated under reflux during 4 hours with 6 parts of Raney nickel (prepared by the method W1 described in the Journal of the American Chemical Society, 1947, 69, 3040). The mixture is then filtered, cooled and again filtered. The solid residue consists of 5 - phenyl - 5 - ethyltetrahydropyrimidine-4:6-dione ethanolate; i. e. 2-ethoxy-5-phenyl-5-ethylhexahydropyrimidine-4:6-dione, which is recrystallised from aqueous ethanol and then has M. P. 186° C. with decomposition.

If in the process of this example methanol is used in place of ethanol there is obtained the corresponding methanolate i. e. 2-methoxy-5-phenyl - 5 - ethylhexahydropyrimidine - 4:6 - dione, M. P. 185° C. with decomposition.

If in place of the 5-phenyl-5-ethyl-2-thiobarbituric acid there is used 5-Δ²-cyclohexenyl-5-ethyl-2-thiobarbituric acid there is obtained 5-Δ²-cyclohexenyl-5-ethyl - 2 - ethoxy - hexahydropyrimidine-4:6-dione, M. P. 150° C.

Example 2

2 parts of 5-phenyl-5-ethyl-2-thiobarbituric acid, 200 parts of ethanol and 10 parts of Raney cobalt are heated under reflux for 5 hours. The Raney cobalt is made in a similar way to W5 Raney nickel described in the Journal of the American Chemical Society, 1948, 70, 695. The mixture is filtered, cooled and filtered again. The solid residue consists of 2-ethoxy-5-phenyl-5-ethylhexahydropyrimidine - 4:6 - dione, M. P. 185–186° C. with decomposition.

Example 3

5 parts of 5-phenyl-1-methyl-5-ethyl-2-thiobarbituric acid (M. P. 124–6° C., prepared by heating phenylethylmalonyl chloride with N-methylthiourea at 100° C. for 9 hours), 300 parts of methanol and 20 parts of Raney cobalt are heated under reflux for 3 hours. The mixture is then filtered while hot and the solvent is distilled from the filtrate under reduced pressure and the residual solid is crystallised from aqueous methanol. There is obtained 2 - methoxy-5-phenyl - 1 - methyl - 5 - ethylhexahydropyrimidine-4:6-dione, M. P. 156–7° C. with decomposition.

By using in the process of this example 5-phenyl-1:5-diethyl-2-thiobarbituric acid, M. P. 125–126° C. there is obtained 2-methoxy-5-phenyl - 1:5 - diethylhexahydropyrimidine-4:6-dione, M. P. 130–131° C.

Example 4

1 part of 5-phenyl-5-ethyl-2-thiobarbituric acid dissolved in 10 parts of ethanol is heated under reflux for 4 hours with 1 part of settled W5 Raney nickel sludge. The mixture is then filtered hot and the filtrate is concentrated to small volume and cooled. The solid is recrystallised from aqueous alcohol and 2-ethoxy-5-phenyl - 5 - ethylhexahydropyrimidine - 4:6 - dione, M. P. 186° C., with decomposition, is obtained.

Example 5

10.3 parts of α:α-phenylethylmalondiamide are added to a solution of 1.15 parts of sodium in 25 parts of methanol. 3.7 parts of ethyl formate are added and the mixture is heated under reflux for 6 hours. It is then cooled and poured into an excess of aqueous hydrochloric acid and ice. The mixture is filtered and the solid is crystallised from aqueous methanol to give 2-methoxy - 5 - phenyl - 5 - ethylhexahydropyrimidine-4:6-dione, M. P. 185° C. with decomposition.

Example 6

7.8 parts of sodium are dissolved in 200 parts of ethanol and the solution is mixed with 65 parts of α:α-phenylmethylmalondiamide and 100 parts of ethyl formate. The mixture is heated under reflux for 2 hours, cooled and poured into an excess of aqueous hydrochloric acid and ice. The mixture is filtered and the solid residue is crystallised from ethanol to give 2-ethoxy-5-phenyl-5-methylhexahydropyrimidine-4:6-dione, M. P. 183–5° C., with decomposition.

Example 7

9 parts of sodium are dissolved in 150 parts of methanol. 66 parts of diethylphenylethylmalonate are added to the solution. The mixture is cooled to 0° C. and 20 parts of formamidine hydrochloride are added and the mixture is stirred at 0° C. for 6 hours and then allowed to stand at atmospheric temperature for 5 days and the residue stirred with an excess of aqueous hydrochloric acid. The mixture is filtered and the solid is crystallised from aqueous methanol. 2-methoxy-5-phenyl-5-ethylhexahydropyrimidine - 4:6-dione is obtained; M. P. 185° C. with decomposition.

Example 8

A solution of 2 parts of 2-methylthio-5-phenyl-5-ethyltetrahydropyrimidine - 4:6 - dione in 40 parts of ethanol is heated under reflux for 3 hours together with 1 part of settled W1 Raney nickel sludge. The mixture is then filtered and the filtrate is evaporated to small volume, cooled and filtered. The solid is crystallised from ethanol. There is obtained 2-ethoxy-5-phenyl-5-ethylhexahydropyrimidine - 4:6 - dione, M. P. 180–181° C. (decomp.).

Example 9

10 parts of N-formyl α:α-phenylethylmalondiamide are added to a solution of 1 part of sodium in 40 parts of methanol. The mixture is heated under reflux for 1 hour, cooled and filtered. The filtrate is neutralised by addition of methanolic hydrogen chloride, filtered, and the solid residue is washed with water. It is then crystallised from methanol and 2-methoxy-5-phenyl-5-ethylhexahydropyrimidine-4:6-dione, M. P. 185° C. with decomposition, is obtained.

Example 10

A solution of 1 part of 2-methoxy-5-phenyl-5-ethylhexahydropyrimidine-4:6-dione in 10 parts of ether is saturated with hydrogen chloride gas at 0–10° C. The product is filtered and the solid residue is washed with ether and crystallised from glacial acetic acid. 5-phenyl-5-ethyltetrahydropyrimidine-4:6-dione monohydrochloride, M. P. 370° C., with decomposition, is obtained.

This substance is stirred with an excess of a cold alcohol and is thus converted into the corresponding 2-alkoxy-hexahydropyrimidine-4:6-dione. In this way the following are prepared: 2-n-propoxy-, M. P. 159–160° C., 2-iso-propoxy-, M. P. 155–156° C., 2-n-butyloxy-, M. P. 151–152° C., 2-sec.-butyloxy-, M. P. 125–126° C., 2-n-amyloxy-, M. P. 124–126° C., 2-n-octyloxy-, M. P. 115–120° C., 2-alkyloxy-, M. P. 159–160° C., 2-benzyloxy-5-phenyl - 5 - ethylhexahydropyrimidine-4:6-diones, M. P. 169° C. These substances can also be made by addition of the appropriate alcohol to 5-phenyl - 5 - ethyltetrahydropyrimidine-4:6-dione, M. P. 115–120° C., prepared by high-vacuum sublimation of its hydrate above 125° C. or its alcoholates above 180° C. or to its hydrate.

Example 11

1 part of 5-phenyl-5-ethyltetrahydropyrimidine-4:6-dione monohydrochloride is dissolved in 20 parts of cold water and sodium acetate in aqueous solution is added until the mixture has pH 6. It is then allowed to stand for 24 hours and is then filtered. The solid is washed with water and dried. 5-phenyl-5-ethyltetrahydropyrimidine-4:6-dione monohydrate, M. P. 120–121° C. with decomposition, is obtained.

What we claim is:

1. New 2-alkoxy-hexahydropyrimidine-4,6-dione derivatives of the formula

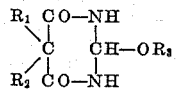

wherein R₁ stands for a phenyl radical, R₂ stands for an alkyl radical of not more than 3 carbon atoms, and R₃ stands for a radical selected from the group consisting of alkyl and aralkyl radicals.

2. A process for the manufacture of the 2-alkoxy - hexahydropyrimidine-4,6-dione derivatives of claim 1, which comprises reacting a compound selected from the group consisting of diamides of the formula

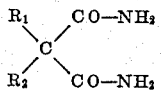

N-formyl derivatives of the formula

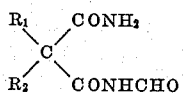

and esters of malonic acid derivatives of the formula

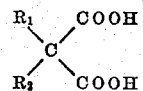

wherein R₁ and R₂ have the meaning stated in claim 1, with a member of the group consisting of formic acid esters, alcoholic solutions of alkali metal alkoxides and formamidine, said reaction being effected with (a) a formic acid ester and in the presence of an alkali metal alkoxide condensing agent when said compound is a diamide, (b) an alcoholic solution of an alkali metal alkoxide when said compound is an N-formyl derivative, and (c) a formamidine and in the presence of an alkali metal alkoxide condensing agent when said compound is an ester.

WILLIAM ROBERT BOON.
CHARLES HENRY VASEY.

References Cited in the file of this patent
UNITED STATES PATENTS

| Number | Name | Date |
|---|---|---|
| 2,576,279 | Boon et al. | Nov. 27, 1951 |